United States Patent [19]
Eisenberg et al.

[11] 3,975,834
[45] Aug. 24, 1976

[54] SIMULATED FLAME TORCH

[75] Inventors: Robert M. Eisenberg, Woodbine, Md.; Walter E. Myles, Alexandria, Va.

[73] Assignee: The Singer Company, New York, N.Y.

[22] Filed: Aug. 4, 1975

[21] Appl. No.: 601,421

[52] U.S. Cl. ............................. 35/1; 35/10
[51] Int. Cl.² ................................ G09B 9/00
[58] Field of Search ............... 35/1, 10; 231/126; 110/1 F

[56] References Cited
UNITED STATES PATENTS 3,675,343   7/1972   Swiatosz ........................ 35/10

*Primary Examiner*—Jerome Schnall
*Attorney, Agent, or Firm*—Ronald Reichman; James C. Kesterson

[57] ABSTRACT

A simulated flame torch which gives a student the opportunity to light a simulated furnace using the simulated torch without actually starting a fire and incurring a potential fire hazard. The apparatus comprises a hollow shaft that is attached to a handle; a plurality of light pipes connected to the shaft near its bottom; a source of electric power contained within the shaft; a plurality of electric lamps coupled to the power source; and means for turning the lamps on so that light will be transmitted through the light pipes simulating a flame when the light moves through the air. Thus, the device can be used to teach a student the proper procedure for handling a lighted torch.

10 Claims, 5 Drawing Figures

SIMULATED FLAME TORCH

BACKGROUND OF THE INVENTION

1. Field of the Invention

This invention relates to training devices and, more particularly, to devices that simulate flames.

2. Description of the Prior Art

The discovery of fire by mankind marked the dawn of civilization. From that time to the present, man has often started one fire by using the heat generated from another fire. For instance, a burning log on one campfire may be removed from that fire and carried to a stack of dry logs, causing the dry logs to burn. The burning log that was removed from the campfire in essence is a torch.

To this date, flame torches are used to ignite the burner in ships' boilers. The modern-day torch that is employed to light the burners in ships' boilers comprises a piece of iron in the shape of a rod with a handle connected to its top and rags tied to its bottom. The torch is stored in a container which contains a nonvolatile oil. When the torch is removed from its container, the rags at the bottom of the torch will be saturated with oil. Thus, when a burning object, such as a match or cigarette lighter, is placed in contact with the rags, the oil contained within the rags will begin to burn. The torch may then be used to ignite the burner in a boiler. If the torch is placed back into its container, the pool of non-volatile oil at the bottom of the container will extinguish the torch's flame.

Teaching a student the proper procedure for starting a boiler using a torch can be hazardous and, if the instruction is conducted indoors, an insurance carrier may increase the premiums for the building's fire insurance. Thus, for safety and educational purposes, simulated boilers were designed. The torch used to ignite the simulated boilers did not have a flame and ignited the simulated burner by throwing some switch inside the burner.

SUMMARY OF THE INVENTION

This invention overcomes the disadvantages of the prior art by providing a simulated flaming torch that produces a simulated flame that is not hazardous. The simulated flame is started by placing a lit match or other heated object in contact with a portion of the torch. The simulated flame that is produced will blow in the breeze when the torch is moved from one place to another and the torch may be used to ignite a burner in a simulated furnace. By placing the torch in a simulated container, the simulated flame may be extinguished. Thus, this invention is a simulated torch that closely resembles an actual torch in appearance and as to the manner in which the torch may be lit and the flame extinguished.

Since the simulated torch's operation and use is similar to the device used in the real world, the simulated torch may be used in movies and other artistic performances where the use of a real flame can be dangerous. In fact, the simulated torch is so safe that it can be used as a child's toy.

It is an object of this invention to provide a new and improved simulated torch that is safe.

It is a further object of this invention to provide a new and improved simulated torch that lights similar to an actual torch.

Other objects and advantages of this invention will become apparent as the following description proceeds, which description should be considered together with the accompanying drawings.

DESCRIPTION OF A PREFERRED EMBODIMENT

Figure 1:
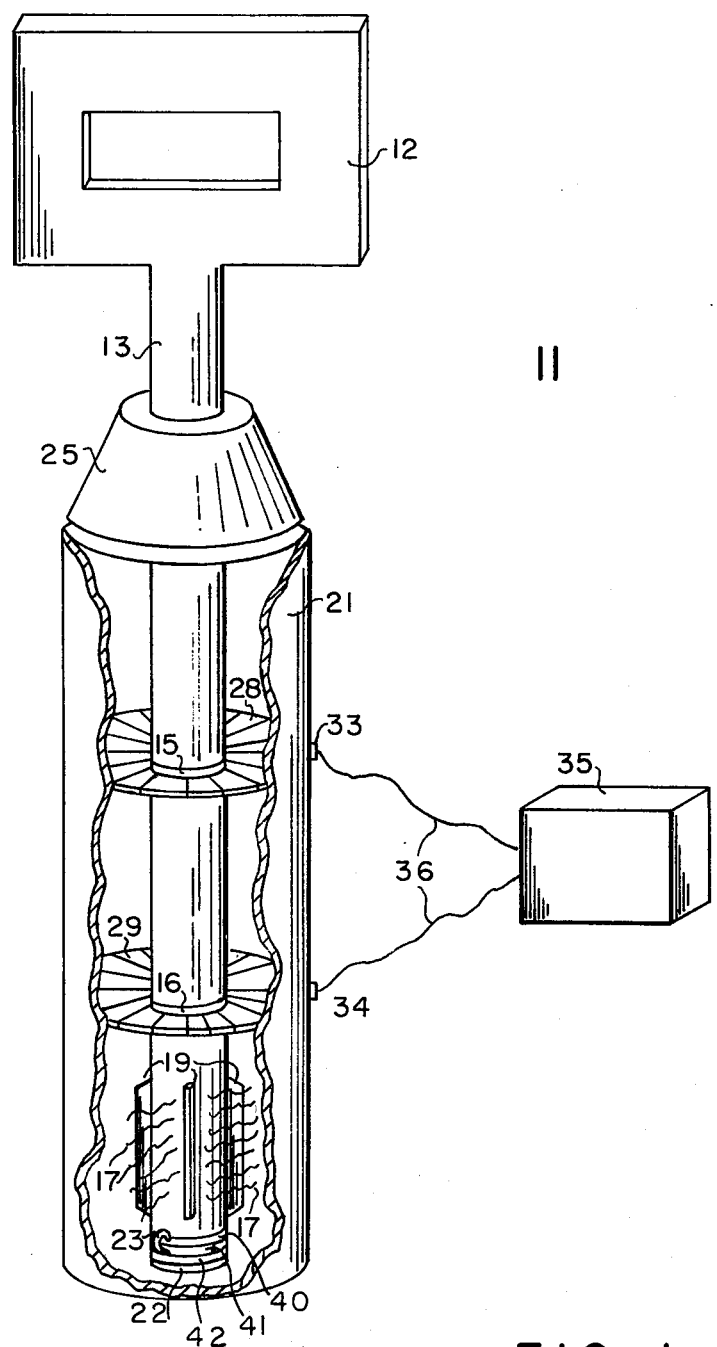
FIG. 1 is a perspective representation partially in section showing the apparatus of this invention being stored in its container.

Referring to the drawings in detail, the reference character 11 designates a simulated torch comprising a handle 12 that is tangentially connected to shaft 13. A shield 25 is connected to shaft 13. Electrical charger contacts 15 and 16 are flush with but insulated from the surface of shaft 13. A plurality of fiber optic light pipes 17 are mounted near the end of torch 11 in a pattern similar to the manner that bristles are distributed on a bottle brush. Since light pipes 17 are small enough in diameter to move from the air flow when torch 11 is moved, light pipe guards 19 are attached near the bottom of shaft 13 to preclude light pipes 17 from being shaved off when torch 11 is placed in container 21. Magnet 22 is placed on the bottom of shaft 13 and bimetallic latch 23 is connected to plate 40 and is flush with the surface of shaft 13. Magnet 22 holds plate 42 above plates 41 and 40. The operation of plates 40, 41 and 42 is described in FIG. 3. Container 21 is shaped in the form of a cylindrical tube with a top opening in the shape of the bottom surface of shield 25, and a bottom portion in the shape of a plate. The top of container 21 has an opening in which torch 11 may be inserted so that shield 25 is flush with the top of container 21. A plurality of phosphor bronze fingers 28 and 29 are connected to but insulated from the inside surface of container 21 parallel to the top of container 21. The distance between fingers 28 and 29 on container 21 is the same distance that exists between contacts 15 and 16 on shaft 13. Fingers 28 and 29 are connected to a source of electrical power such as rechargeable batteries 30 (shown in FIG. 2). Electrical terminal 33 is coupled to fingers 28 and connected to the outer surface of container 21 and terminal 34 is coupled to fingers 29 and connected to the outer surface of container 21. Terminals 33 and 34 are connected to charger 35 by means of wires 36. Thus, when torch 11 is inserted in container 21, contact 15 will be in electrical contact with fingers 28 and contact 16 will be in electrical contact with fingers 29, causing battery 30 to be charged.

The above described apparatus is a simulated torch which is capable of simulating a flame. This simulated flame may be transported by means of torch 11 to another simulated device such as a simulated furnace and cause the simulated device to produce a simulated flame. This may be accomplished in the following manner. Magnet 22 on the bottom of shaft 13 may be used to activate a proximity switch in a simulated furnace (not described) causing the electronic circuit of the simulated furnace to produce a simulated flame.

Figure 2:
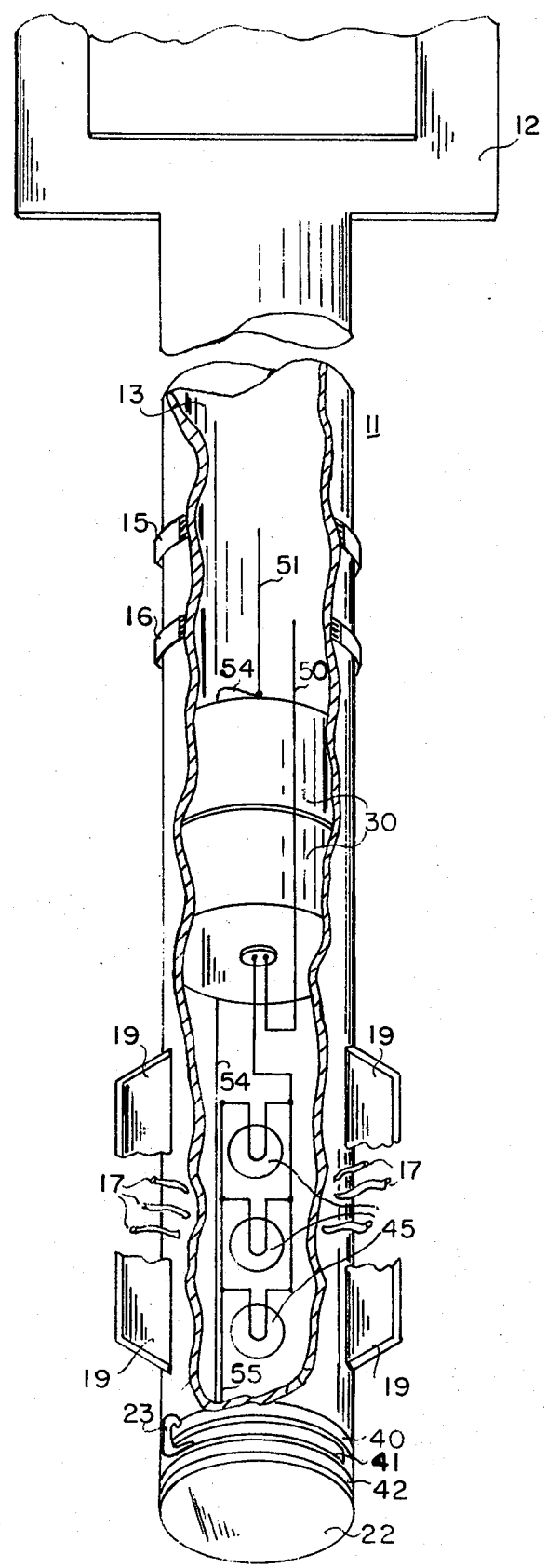
FIG. 2 is a perspective representation partially in section showing the torch of FIG. 1.

FIG. 2 is a perspective representation partially in section showing torch 11 with handle 12 and shaft 13 in greater detail. Electrical contacts 15 and 16 are connected to the shaft 13. Guide plate 42 is positioned above magnet 22. Plates 40 and 41 are held in place just above guide plate 42 by means of bimetallic latch 23. Guards 19 are connected to shaft 13 to insure that light pipes 17 will not be shaved off when torch 11 is placed in a container or simulated furnace.

Rechargeable batteries 30 which are connected in series are contained within shaft 13 just below electrical contact 16. Batteries 30 are held in place inside shaft 13 by any suitable means. A plurality of lamps 45 are mounted inside shaft 13 so that the light radiated from lamps 45 will be transmitted to the outside of shaft 13 via light pipes 17. Electrical contact 16 is coupled to the positive terminal of battery 30 by means of wire 50 and electrical contact 16 is coupled to the negative terminal of battery 30 by means of wire 51. The negative terminal of battery 30 is connected to plate 40 by wire 54. Wire 55 connects lamps 45 to plate 43. Lamps 45 are also connected to the positive terminal of battery 30. Light is transmitted from lamps 45 to the outside surface of torch 11 via light pipes 17. The nature of light pipes 17 causes most of the light entering pipe 17 to be internally reflected and transmitted from the end of fibers 17. However, when light pipes 17 are bent (when the torch is waved in the breeze), the critical angle of the optical fibers will change and some light will be radiated from the sides of fibers 17 simulating a flame. Lamps 45 may be colored so that the light radiating from the ends of light pipes 17 is the same color as a flame produced when oil is ignited. The manner in which lamps 45 are illuminated is described in FIG. 3.

Figure 3:
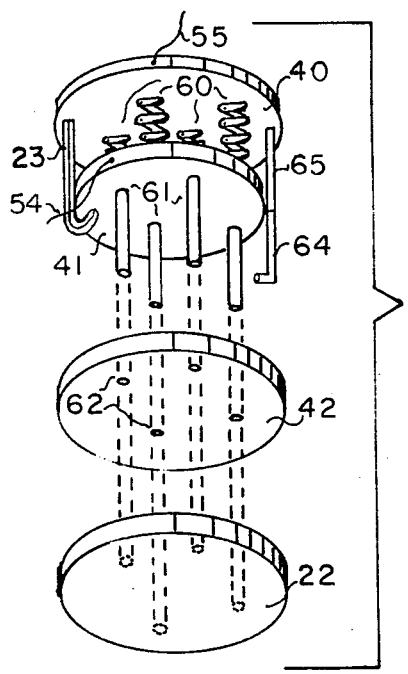
FIG. 3 is a perspective representation showing the interaction of plates 40, 41 and 42.

FIG. 3 is a perspective representation showing the interaction of plates 40, 41 and 42, thus describing the manner in which lamps 45 are illuminated. Plates 40, 41 and 42 and magnet 22 are arranged in the following order: magnet 22, plate 42, plate 41 and plate 40. Plates 40 and 42 have the same diameter and the diameter of plate 41 is somewhat smaller. A plurality of compression springs 60 (non-conductors of electricity) are attached to plate 40 (a conductor of electricity) and a plurality of metallic rods 61 are attached to plate 41 (a conductor of electricity), rods 61 being perpendicular to plate 41. A plurality of holes 62 are cut through the surface of guide plate 42 enabling rods 61 to pass through plate 42 and secured to magnet 22. Bimetallic latch 23 is connected to plate 40, and conductor 64, together with insulating cover 65, electrically connected to plate 40. Wire 54 is connected to plate 41 and, as shown in FIG. 2, is also connected to the negative terminal of battery 30. Wire 55 is connected to plate 40 and, as shown in FIG. 2, is also connected to lamps 45. Bimetallic latch 23 holds plate 41 against insulator 65. When a hot object, such as a match, is placed near latch 23, latch 23 will bend, release plate 41 from insulator 65, and permit plate 41 to be moved by springs 60 to contact conductor 64 causing lights 45 (shown in FIG. 2) to be illuminated. Thus, light will be radiated from the ends of fibers 17 making torch 11 which is shown in FIG. 2 to appear lit. The cooling of latch 23 will cause bimetallic latch 23 to change in shape and be ready to hold and engage plate 41 against insulator 65. When torch 11 is placed in container 21 for storage, magnet 22 will be in contact with the bottom of container 21 causing plate 42 to push against and move plate 41 so that plate 41 will be held against insulator 65 by latch 23 causing lamps 45 to be turned off.

Figure 4:
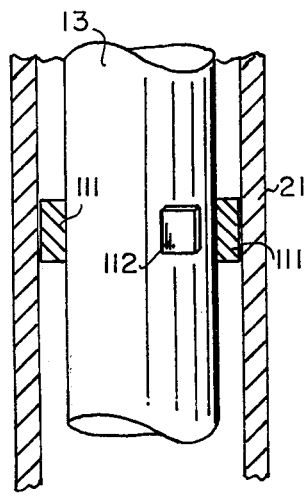
FIG. 4 is a front view of an alternative embodiment of this invention.

FIG. 4 is a front view of an alternative embodiment of this invention. A pressure-sensitive switch 112 is attached to shaft 13 with a portion of switch 112 protruding from the surface of shaft 13. Switch 112 is coupled to batteries 30 (not shown) by means of wires (not shown). A strip of material 111 is connected around a portion of the inside surface of container 21 so that when shaft 13 is inserted into container 21, material 111 will be forced against shaft 13, and open switch 112. The withdrawal of shaft 13 from container 21 will cause switch 112 to be closed and thus energize lamps 45 (not shown). Hence, the simulated torch will be able to produce a flame without the necessity of placing a hot object in contact with latch 23, enabling the apparatus of this invention to be used as a child's toy.

Figure 5:
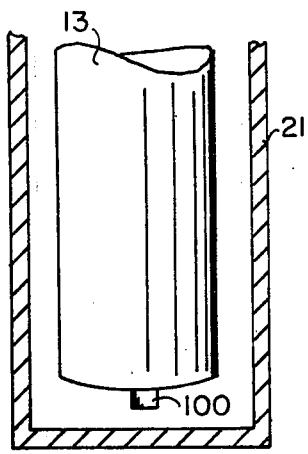
FIG. 5 is a front view of another alternative embodiment of this invention.

FIG. 5 is a front view of another alternative embodiment of this invention. A pressure-sensitive switch 100 is connected to the bottom of shaft 13 and coupled to batteries 30 (not shown). When shaft 13 is inserted into container 21, the weight of shaft 13 pushing on the bottom of container 21 will cause switch 100 to open, turning off lamps 45 (not shown). Hence, the removal of shaft 13 from container 21 will open switch 100 causing lamps 45 (not shown) to be illuminated.

The above specification describes a new and improved simulated torch which may be used to ignite simulated furnaces. It is realized that the above description may indicate to those skilled in the art additional ways in which the principles of this invention may be used without departing from its spirit. It is, therefore, intended that this invention be limited only by the scope of the appended claims.

What is claimed is:

1. A simulated flame torch which comprises:
   a. a portable housing containing hollow space; a handle at one end of said housing;
   b. means for producing light contained within the hollow space of said member;
   c. a source of electric power coupled to said light producing means;
   d. heat sensing means for turning said light producing means on;
   e. a plurality of flexible light pipes attached to said housing at its opposite end for transmitting light from said light producing means to the outside of said member whereby a simulated flame is produced when said member is moved through the air; and
   f. a container for said housing and means for turning said light producing means off when said housing is placed in said container.

2. The device claimed in claim 1 wherein said means for producing light comprises a plurality of lamps.

3. The device claimed in claim 2 wherein said plurality of lamps radiate a yellowish orange light.

4. The device claimed in claim 1 wherein said heat sensing means comprises:
   a. a first member that is a conductor of electricity coupled to one side of said light producing means;
   b. a second member that is a conductor of electricity coupled to one side of said source of electric power;

c. resilient means for urging said second member in a desired position spaced away from said first member;

d. means for connecting the other side of said source to the other side of said light;

e. an elongated conductor of electricity with an insulating cover disposed part way along its length, the end of said conductor containing the insulation being electrically connected to said first member, and the portion of said conductor not containing the insulation protruding from said first member; and f. a bimetallic latch attached to said first member and including means for holding said second member in a latched position in contact with said insulating cover when said latch is cool and being released from said latch when heat is applied to said latch releasing said second member from contacting the insulation of said conductor to be in electrical contact with said conductor.

5. The device claimed in claim 4 wherein said means for turning said light producing means off includes:

a. a plurality of rods connected to said second member;

b. a guide plate positioned away from said second member and having a plurality of holdes therethrough so that said rods can pass through said guide plate;

c. said resilient means comprising a plurality of springs connected to said first member between said first and second members; and d. means for preventing said guide plate from slipping over said rods, said last mentioned means engaging the bottom of said container when the housing is inserted into the container to force said second member against the urging of said springs to said latch position to turn said light producing means off.

6. The device claimed in claim 5 wherein said preventing means is a magnet.

7. The device claimed in claim 1 wherein said electric power source is a rechargeable battery.

8. The torch defined in claim 7 wherein said container for storing said torch includes means to recharge said electric batteries.

9. The device claimed in claim 1 wherein said plurality of light pipes are made of a fiber optic material.

10. The device claimed in claim 1 further including light pipe guards attached to said housing to prevent said light pipes from being easily shaved off.

* * * * *